United States Patent
Allen et al.

(10) Patent No.: US 8,156,157 B2
(45) Date of Patent: *Apr. 10, 2012

(54) GEOSPATIAL MODELING SYSTEM PROVIDING WINDOWED GEOSPATIAL MODEL DATA INPAINTING AND RELATED METHODS

(75) Inventors: Josef De Vaughn Allen, Melbourne, FL (US); Mark Rahmes, Melbourne, FL (US); Gnana Bhaskar Tenali, West Melbourne, FL (US); Emile Ganthier, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 775 days.

This patent is subject to a terminal disclaimer.

(21) Appl. No.: 11/858,247

(22) Filed: Sep. 20, 2007

(65) Prior Publication Data

US 2009/0083291 A1  Mar. 26, 2009

(51) Int. Cl.
*G06F 7/00* (2006.01)
*G06F 7/60* (2006.01)
*G06F 17/50* (2006.01)
(52) U.S. Cl. .................. 707/803; 702/5; 703/1; 703/2
(58) Field of Classification Search .................. None
See application file for complete search history.

(56) References Cited

U.S. PATENT DOCUMENTS

| | | | |
|---|---|---|---|
| 6,654,690 B2 | 11/2003 | Rahmes et al. | 705/5 |
| 6,985,929 B1 * | 1/2006 | Wilson et al. | 709/217 |
| 6,987,520 B2 | 1/2006 | Criminisi et al. | 345/629 |
| 7,760,913 B2 | 7/2010 | Rahmes et al. | 382/109 |
| 2007/0198586 A1 * | 8/2007 | Hardy et al. | 707/104.1 |
| 2008/0024359 A1 * | 1/2008 | Watkins et al. | 342/25 A |

OTHER PUBLICATIONS

Bertalmio et al. "(Navier-Stokes, Fluid Dynamics, and Image and Video Inpainting)" Proceedings of the International Conference on Computer Vision and Pattern Recognition IEEE, 2001, vol. 1, p. 355-362).*
Hirani et al. "Combining Frequency and Spatial Domain Information for Fast Interactive Image Noise Removal". Research Center, Sony Corporation , 6-7-35 Kitashinagawa Shinagawa-Ku, Tokyo 141, Japan.*
Bartalmio et al. "(Navier-Stokes, Fluid Dynamics, and Image and Video Inpainting)" Proceedings of the International Conference on Computer Vision and Pattern Recognition IEEE, 2001, vol. 1, p. 355-362).*

(Continued)

*Primary Examiner* — Fred I Ehichioya
*Assistant Examiner* — Berhanu Mitiku
(74) *Attorney, Agent, or Firm* — Allen, Dyer, Doppelt, Milbrath & Gilchrist, P.A.

(57) ABSTRACT

A geospatial modeling system may include a geospatial model data storage device, and a processor. The processor may cooperate with the geospatial model data storage device for windowing geospatial model spatial domain data to define a plurality of windowed geospatial model spatial domain data sets, and transforming the plurality of windowed geospatial model spatial domain data sets to define a plurality of corresponding geospatial model frequency domain data sets, each having at least one void therein. The processor may further cooperate with the geospatial model data storage device for inpainting data into the at least one void of each geospatial model frequency domain data set to define a plurality of inpainted geospatial model frequency domain data sets, and reconstructing the plurality of inpainted geospatial model frequency domain data sets into an overall geospatial model frequency domain data set.

20 Claims, 19 Drawing Sheets

OTHER PUBLICATIONS

Reigber et al., *Interference Suppression in Synthesized SAR Images*, IEEE Geoscience and Remote Sensing Letters, vol. 2, No. 1, Jan. 2005.

Grohman et al., *Filling SRTM Voids: The Delta Surface Fill Model*, Photogrammetric Engineering and Remote Sensing, Mar. 2006, pp. 213-216.

Yun et al., "On merging high-and low-resolution DEMs from TOPSAR and SRTM using a prediction-error Filter", IEEE, vol. 43, No. 7, Jul. 2005, pp. 1685-1688.

Bosser et al., "reconstruction of sparse bandwidth by regularization method in SAR imagery", Radar, 2006 IEEE, Apr. 2006, pp. 342-349.

Allen et al., "Topography preserving non-linear autonomous inpainting for bare earth DEM reconstruction", MAPPS/ASPRS Fall Conference, Nov. 2006, pp. 1-9.

Stankwitz et al., "Sparse aperture fill for SAR using super-SVA" IEEE, May 1996, pp. 70-75.

Bertalmio et al., "Image inpainting computer graphics", Computer Graphics Proceedings, Jul. 2000, pp. 417-424.

* cited by examiner

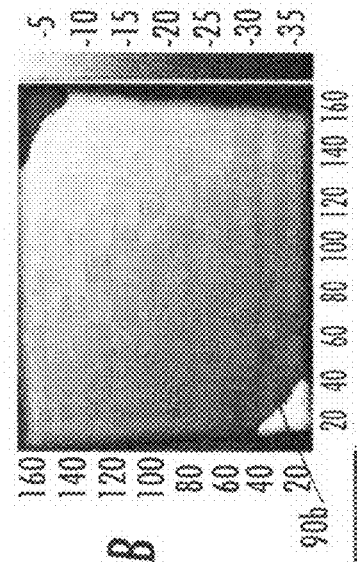
FIG. 8B TOP RIGHT
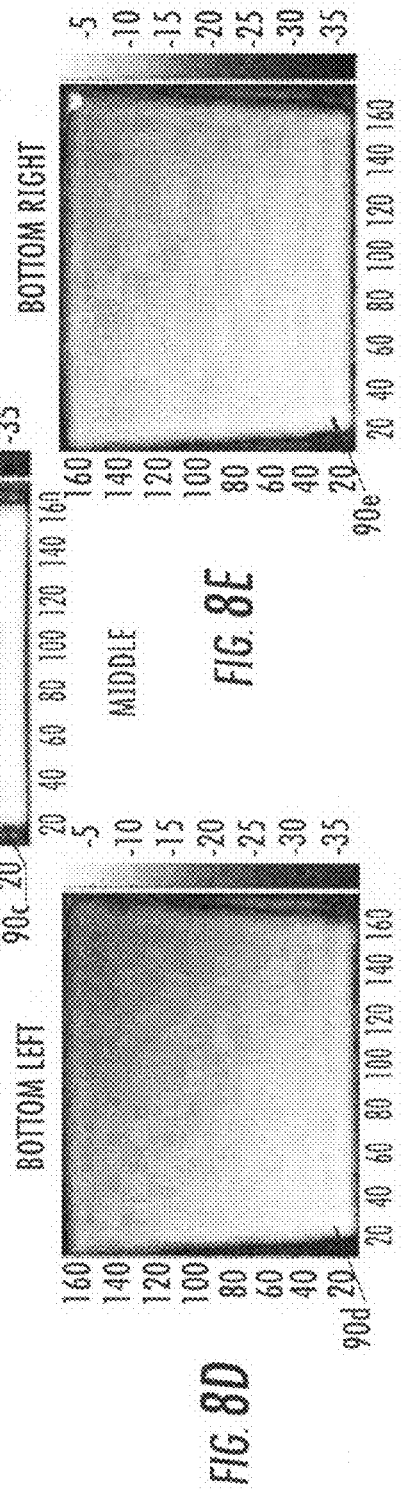
FIG. 8E BOTTOM RIGHT
FIG. 8C MIDDLE
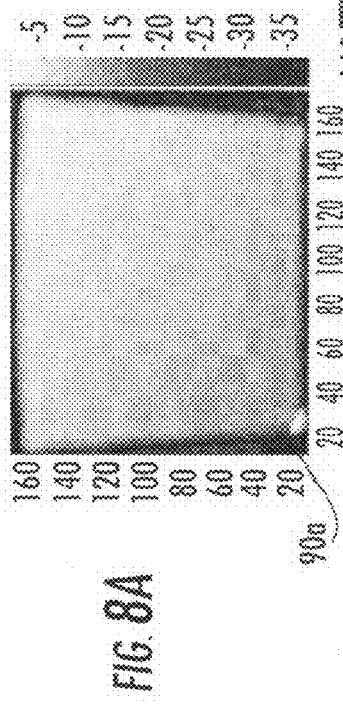
FIG. 8A TOP LEFT
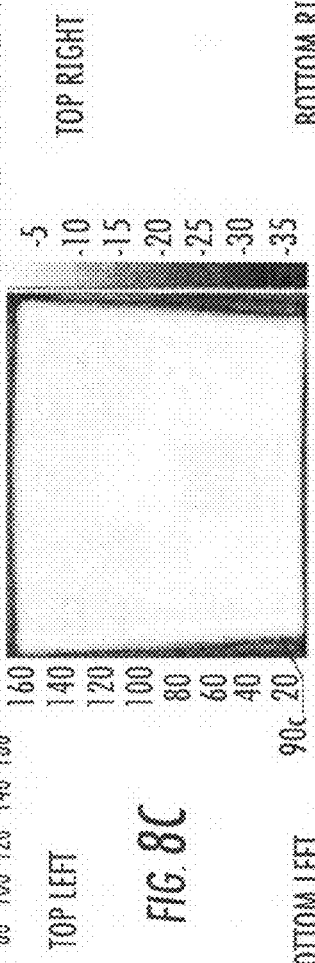
FIG. 8D BOTTOM LEFT

GEOSPATIAL MODELING SYSTEM PROVIDING WINDOWED GEOSPATIAL MODEL DATA INPAINTING AND RELATED METHODS

FIELD OF THE INVENTION

The present invention relates to the field of data modeling, and, more particularly, to modeling systems such as geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® which is a software plugin in Harris' Multi-image exploitation tool from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR), for example. Another similar system from Harris Corp. is LiteSite®. LiteSite® models provide automatic extraction of ground, foliage, and urban digital elevation models (DEMs) from LIDAR and IESAR imagery. LiteSite® can be used to produce affordable, geospatially accurate, high-resolution 3-D models of buildings and terrain.

U.S. Pat. No. 6,654,690 to Rahmes et al., which is also assigned to the present Assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In many instances there will be voids or gaps in the data used to generate a geospatial or other model. The voids negatively affect the quality of the resulting model, and thus it is desirable to compensate for these voids while processing the data, if possible. Various interpolation techniques are generally used for filling in missing data in a data field. One such technique is sinc interpolation, which assumes that a signal is band-limited. While this approach is well suited for communication and audio signals, it may not be well suited for 3D data models. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, this approach may be problematic to implement in a 3D data model because of the difficulty in solving a global spline over the entire model, and because the required matrices may be ill-conditioned. One further drawback of such conventional techniques is that they tend to blur edge content, which may be a significant problem in a 3D topographical model.

Another approach for filling in regions within an image is set forth in U.S. Pat. No. 6,987,520 to Criminisi et al. This patent discloses an exemplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

Another way in which geospatial model data can end up with voids therein is when the data is collected in the frequency domain, as is the case with Synthetic Aperture Radar (SAR) data collection. That is, a SAR returns a map or representation of radar reflectivity including both amplitude and phase over a plurality of different frequencies. However, due to interference from existing signal sources, during some SAR scans certain frequency bands may experience interference in the resulting SAR data. Moreover, the operator of the SAR may have to intentionally omit or block certain frequency bands in certain geographical areas from the scan to avoid interfering with such communication sources. Further, hardware malfunctions may result in pulse dropouts. In each of these cases, the result is that the frequency domain representation of the area of interest will have gaps or voids therein, which when converted to the spatial domain cause the resulting geospatial model image to be distorted.

Generally speaking, various approaches have been used to address the effects of interference in frequency domain data. One approach is to use linear interpolation. Super resolution and/or iterative convolution techniques have also been used which assume a point like target in the image. Moreover, hardware approaches have also been implemented to alter mode hopping to avoid interference or listening on pilot pulses to characterize the interference.

Another approach to interference suppression in SAR images is set forth in an article entitled "Interference Suppression in Synthesized SAR Images" by Reigber et al., IEEE Geoscience and Remote Sensing Letters, vol. 2, no. 1, January 2005. This article proposes an interference suppression approach that relies on the transformation of synthesized SAR images into a representation where common raw-data interference filtering methods can be applied. More particularly, this approach uses a posteriori filtering.

Despite the advantages such prior art approaches may provide in certain applications, further advancements may be desirable for filling voids in geospatial and other model data.

SUMMARY OF THE INVENTION

In view of the foregoing background, the present disclosure presents a modeling system, such as a geospatial modeling system, and related methods which may advantageously fill voids within model or other data and related methods.

This and other objects, features, and advantages are provided by a geospatial modeling system which may include a geospatial model data storage device and a processor. The processor may cooperate with the geospatial model data storage device for windowing geospatial model spatial domain data to define a plurality of windowed geospatial model spatial domain data sets, and transforming the plurality of windowed geospatial model spatial domain data sets to define a plurality of corresponding geospatial model frequency domain data sets, each having at least one void therein. The processor may further cooperate with the geospatial model data storage device for inpainting data into the at least one void of each geospatial model frequency domain data set to define a plurality of inpainted geospatial model frequency domain data sets, and reconstructing the plurality of inpainted geospatial model frequency domain data sets into an overall geospatial model frequency domain data set.

The processor may further transform the overall reconstructed geospatial model frequency domain data set into an overall reconstructed geospatial model spatial domain data set. Moreover, the system may also include a display coupled to the processor for displaying the overall reconstructed geospatial model spatial domain data set. By way of the example, the geospatial model spatial domain data may comprise synthetic aperture radar (SAR) data. The geospatial model frequency domain data sets may comprise K-space data, for example.

The processor may inpaint by propagating contour data from outside each at least one void along a direction of lines of constant contour from outside each at least one void into each at least one void. More particularly, the processor may iteratively propagate the contour data from outside each at least one void into each at least one void. Also, the contour data may comprise at least one of phase and amplitude data. Furthermore, the processor may perform inpainting based upon a functional partial different equation model and/or a stochastic model, for example.

A geospatial modeling method aspect may include windowing geospatial model spatial domain data to define a plurality of windowed geospatial model spatial domain data sets, and transforming the plurality of windowed geospatial model spatial domain data sets to define a plurality of corresponding geospatial model frequency domain data sets, each having at least one void therein. The method may further include inpainting data into the at least one void of each geospatial model frequency domain data set to define a plurality of inpainted geospatial model frequency domain data sets, and reconstructing the plurality of inpainted geospatial model frequency domain data sets into an overall geospatial model frequency domain data set.

BRIEF DESCRIPTION OF THE DRAWINGS

FIGS. 8A-8E are the K-space representations of FIGS. 7A-7E after inpainting.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
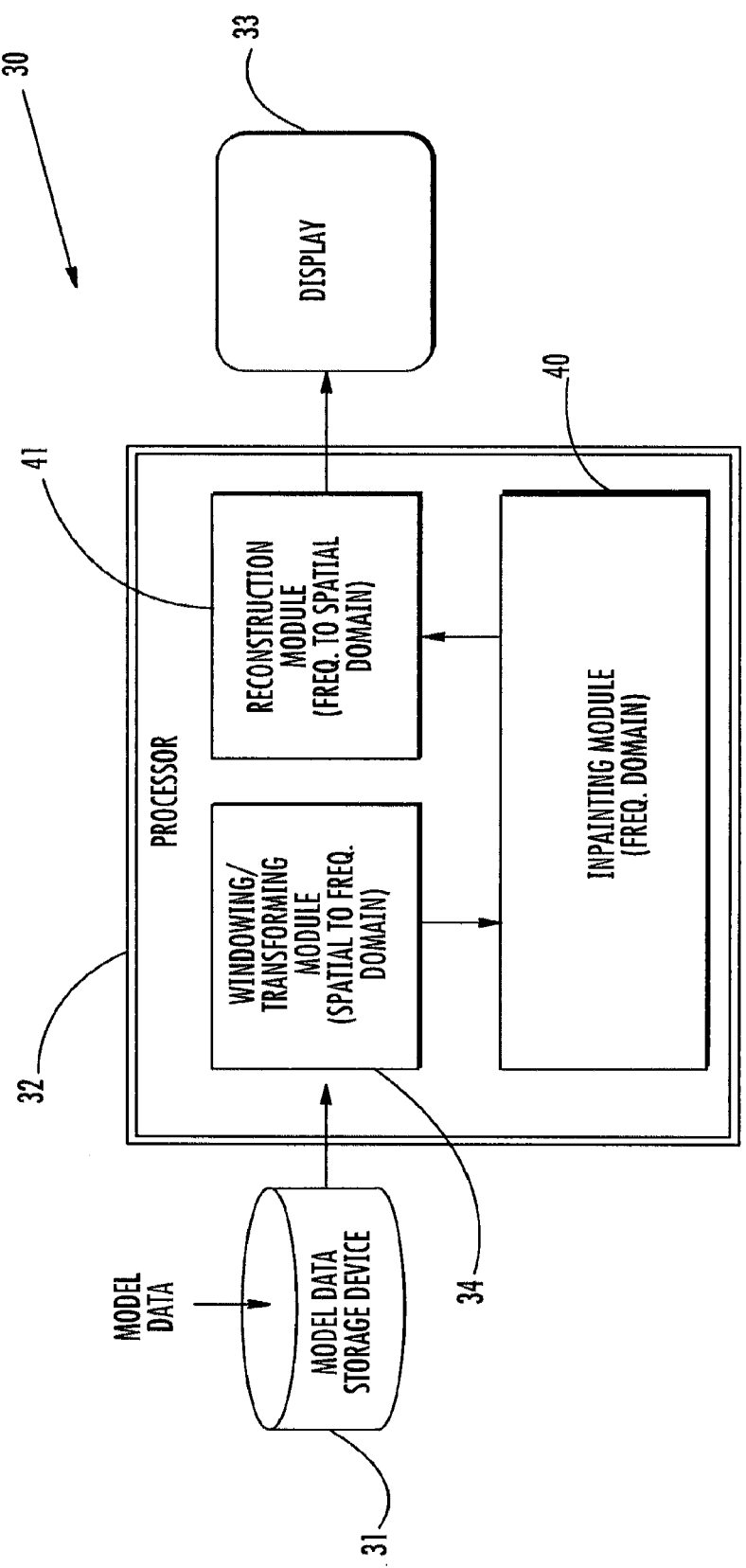
FIG. 1 is a schematic block diagram of a data modeling system in accordance with the invention.

Referring initially to FIG. 1, a modeling system 30, such as a geospatial modeling system, illustratively includes a model data storage device 31 for storing geospatial model data and a processor 32. By way of example, the processor 32 may be a central processing unit (CPU) of a PC, Mac, Sun, or other computing workstation, for example. A display 33 may be coupled to the processor 32 for displaying modeling data. The processor 32 advantageously reconstructs or repairs corrupted model data, such as geospatial model data, by inpainting voids in the data, as will be discussed further below. To this end, the processor 32 illustratively includes a windowing/transforming module 34, an inpainting module 40, and a reconstruction module 41. While these modules are shown and described as separate components for clarity of reference, those skilled in the art will appreciate that the various functions of these components may be implemented with a combination of hardware and software, and that these software components may be included in the same overall software application, for example.

Figure 2A:
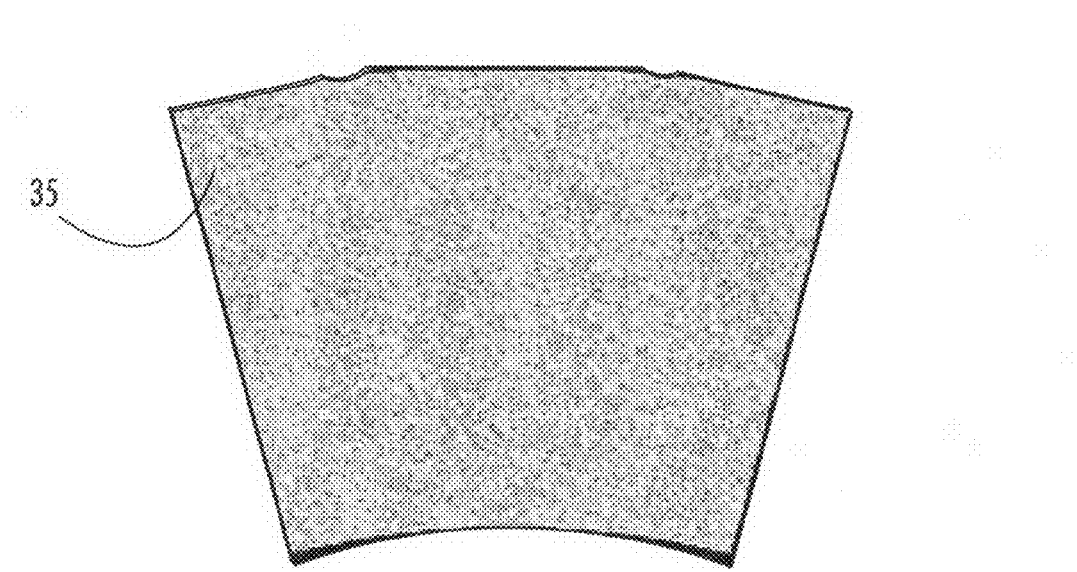
FIGS. 2A and 2B are K-space and image space representations, respectively, of a non-distorted SAR data set.
Figure 2B:
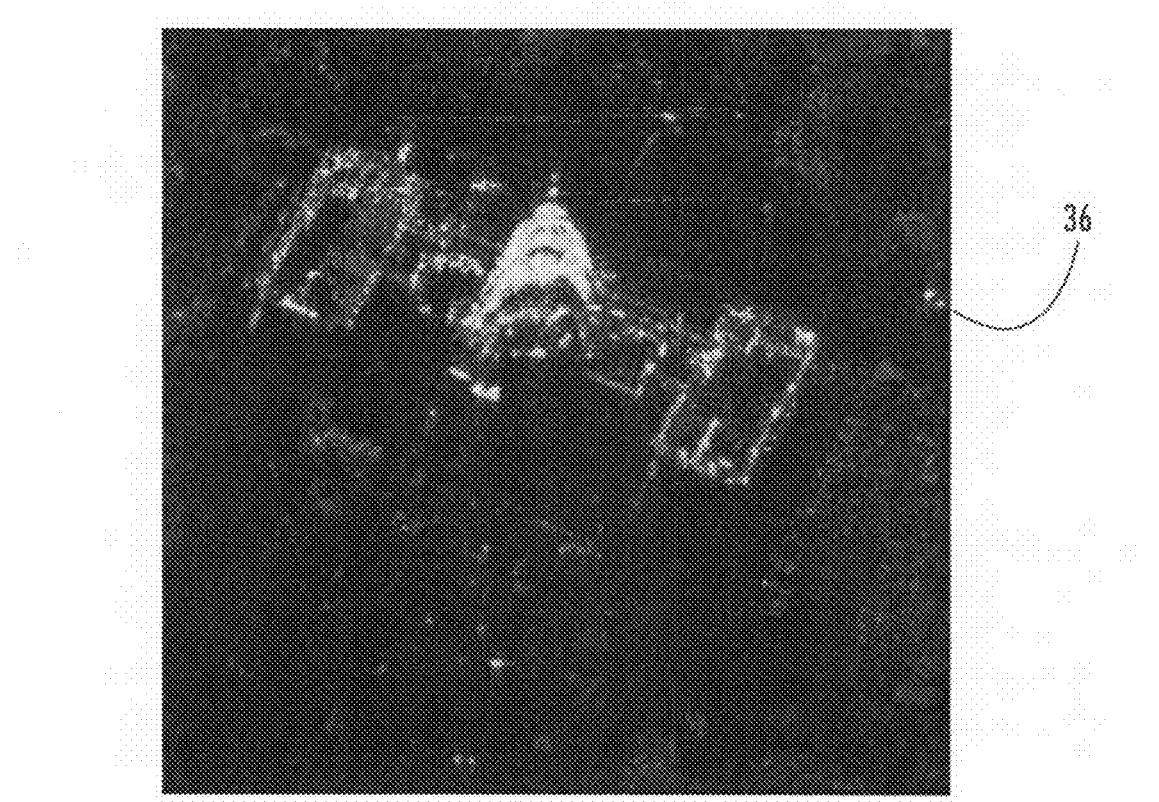

Turning additionally to FIGS. 2A-2B, an exemplar synthetic aperture radar (SAR) geospatial data set is shown for a non-corrupted or non-distorted data capture. That is, FIGS. 2A and 2B represent the ideal case in which no holes or voids in the data have occurred during data capture, such as from interference, notched frequencies, equipment malfunctions, etc., as will be appreciated by those skilled in the art. In particular, the SAR data capture shown is of the U.S. Capitol building.

Generally speaking, one or more data captures of a particular geospatial area of interest are performed to obtain 3D elevation versus position data. The data capture may be performed using various techniques, such as stereo optical imagery, Light Detecting And Ranging (LIDAR), SAR or Interferometric Synthetic Aperture Radar (IFSAR), etc. Generally speaking, the data will be captured from nadir views of the geographical area of interest by airplanes, satellites, etc., as will be appreciated by those skilled in the art. However, oblique images of a geographical area of interest may also be used in addition to or instead of the images to add additional 3D detail to a geospatial model. It should also be noted that the types of data to which the inpainting techniques described below may be applied are not limited to geospatial model data. Rather, these techniques may also be applied to other types of model data that may be represented and processed in the frequency domain or K-spacer such as magnetic resonance imaging (MRI) data, for example.

Figure 3A:
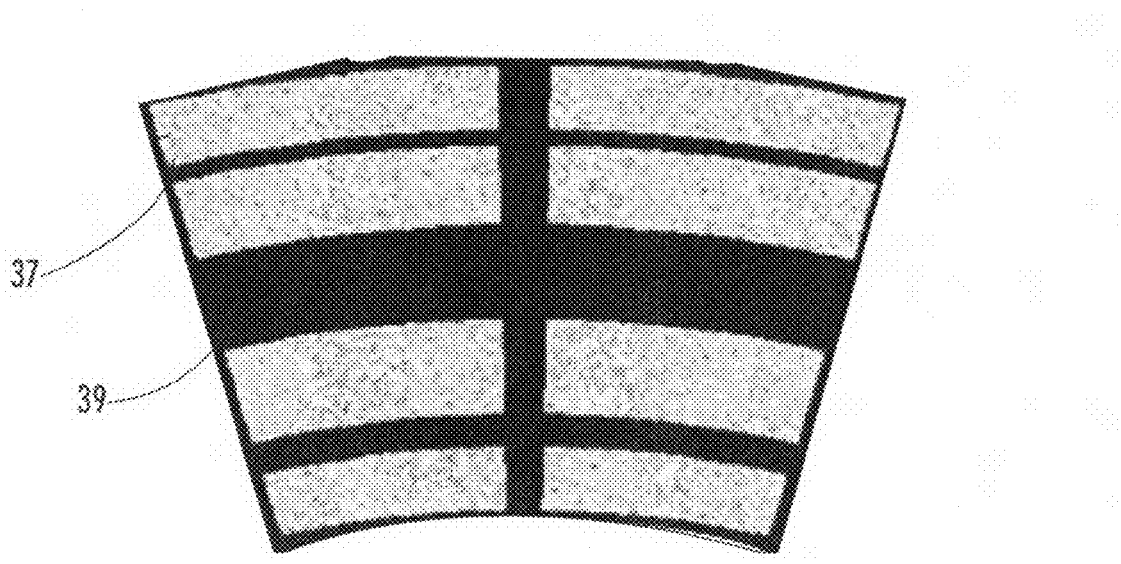
FIGS. 3A and 3B are K-space and image space representations, respectively, of a distorted version of the SAR data set illustrated in FIGS. 2A and 2B.
Figure 3B:
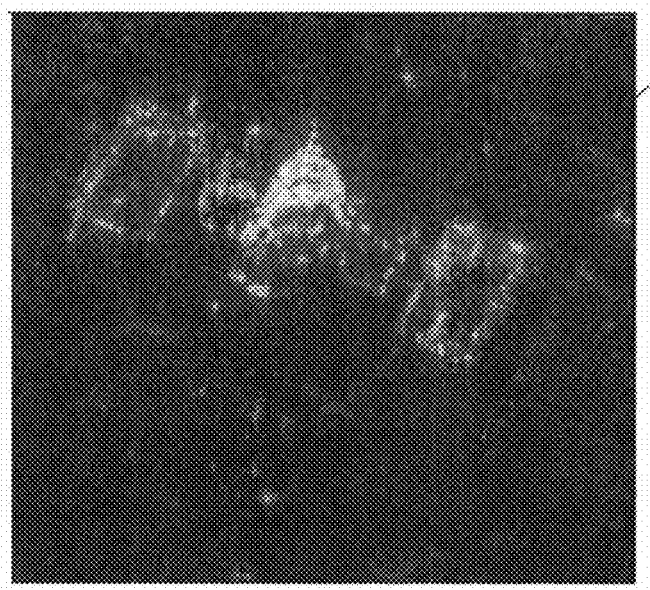

FIGS. 3A and 3B show the effects of voids 39 in the K-space geospatial data 37, which results in a blurred image space data set 38. The processor 32 advantageously uses various inpainting techniques to fill in or repair the voids 39 in frequency data sets, such as the illustrated K-space data set 38, to thereby achieve a reconstructed corresponding image space data set that more closely resembles the uncorrupted image space data set 35. By way of background, exemplary inpainting techniques that may be implemented by the processor 32 are set forth in co-pending U.S. patent application Ser. No. 11/458,811 to Rahmes et al., which is assigned to the present Assignee and is hereby incorporated herein in its entirety by reference.

Further inpainting aspects are now described with reference to FIGS. 4-9 and 14-15. While in some implementations an entire data set may be inpainted as a whole to provide desired reconstruction accuracy, in other cases there may be a need to "smooth" the data so that the various inpainting model functions can provide more accurate data reconstruction. Beginning at Block 160, a spatial domain data set, such as the geospatial spatial domain data 38 may advantageously be divided into a plurality of windows 50 (herein referred to as "windowed" or "windowing") by the windowing module 34. It should be noted that depending upon the format of the model data stored in the model data storage device 31 (i.e., if the collected/stored data is frequency domain or K-space data), the windowing module 34 may first transform the data to the spatial domain prior to performing windowing operations.

Figure 5A:
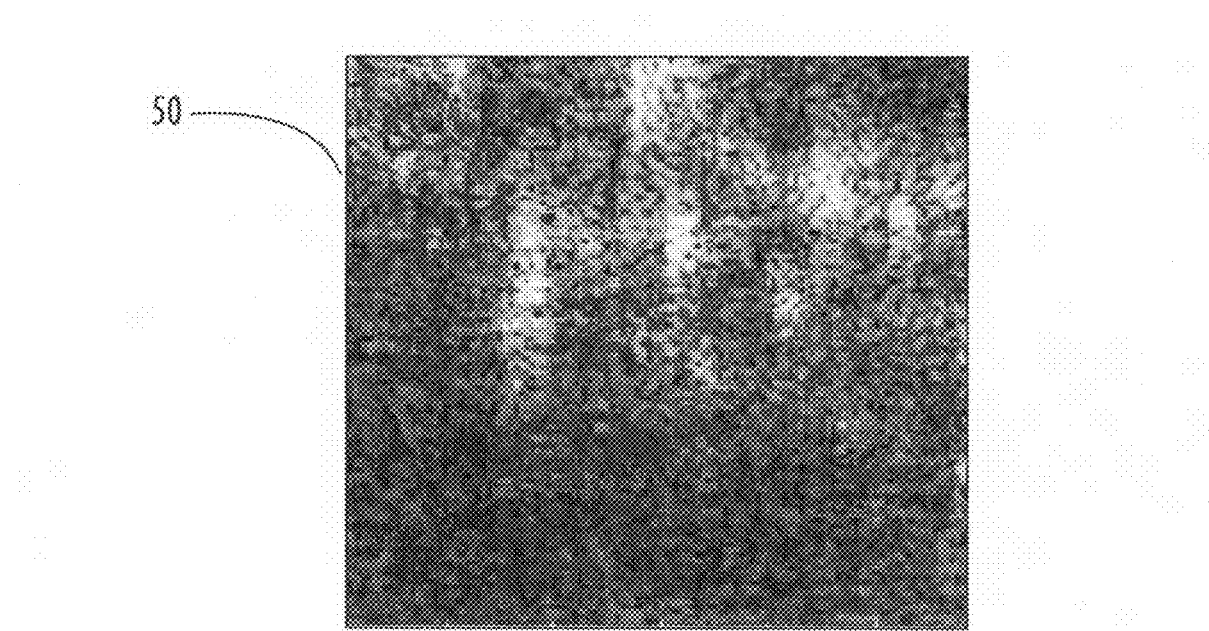
FIGS. 5A and 5B are K-space and image space representations, respectively, of a spatial window of the distorted image space data set of FIG. 4.
Figure 5B:
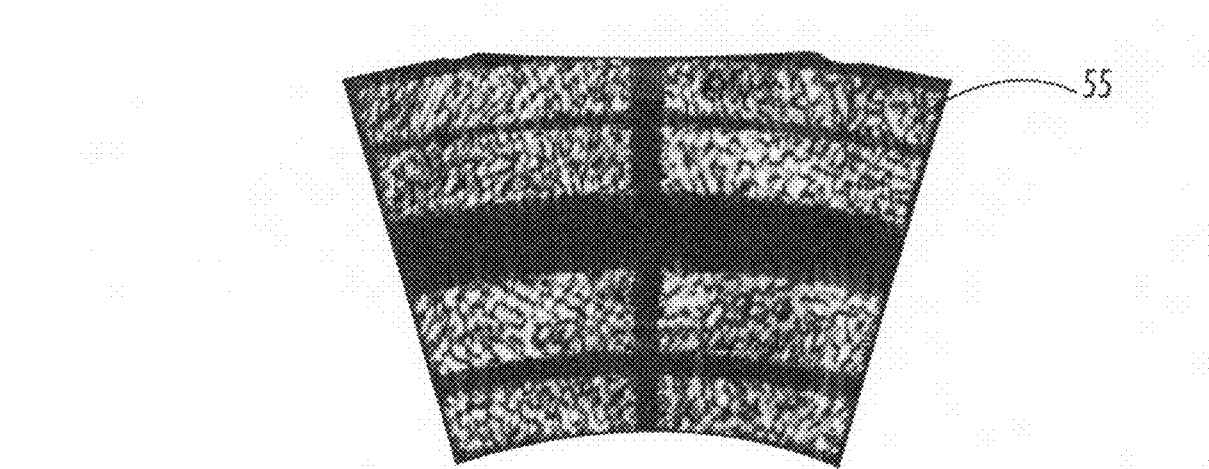
Figure 6:
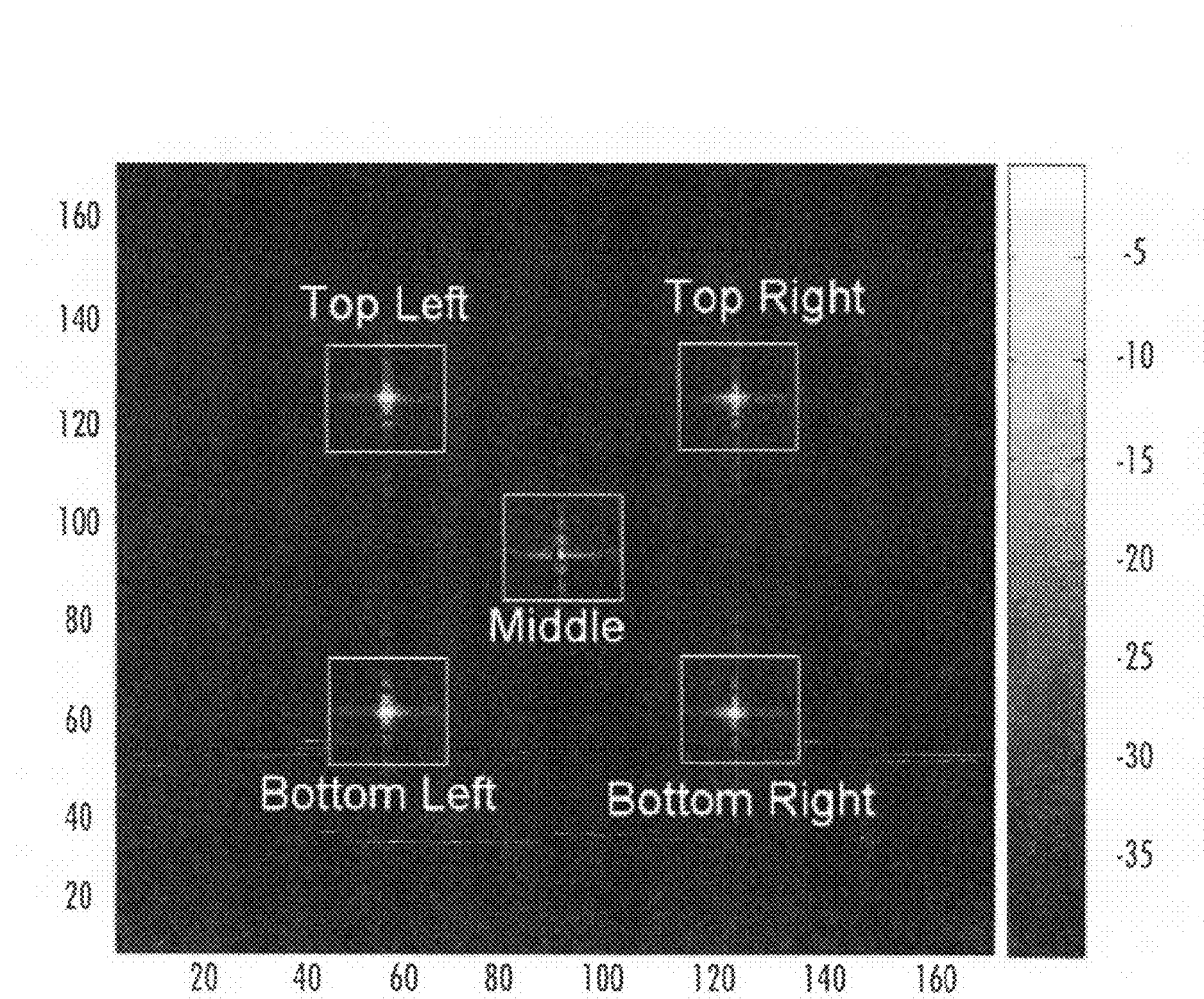
FIG. 6 is an image space representation of a plurality of scatterer points illustrating another windowing technique in accordance with an alternative embodiment.
Figures 7A, 7B, 7C, 7D, 7E:
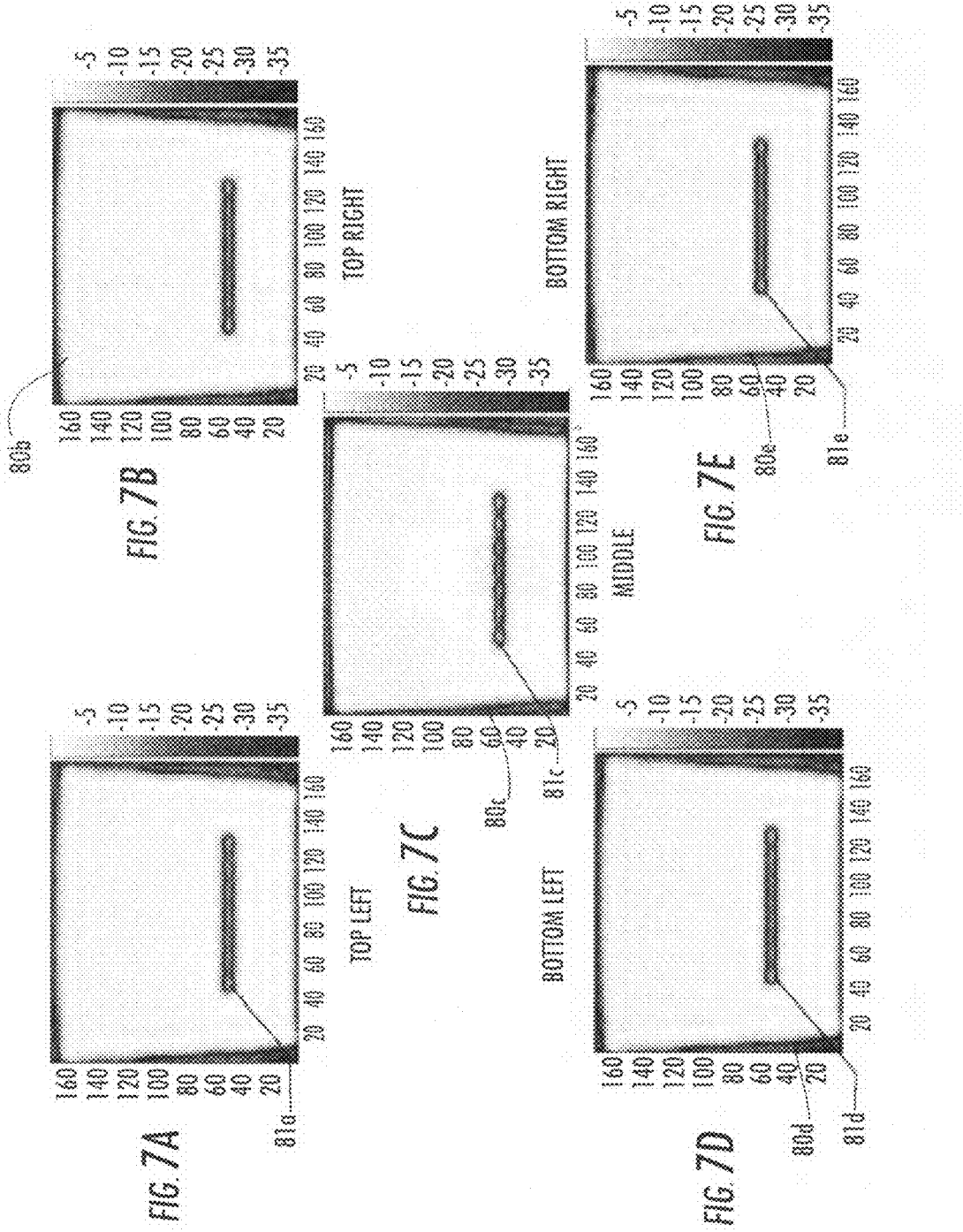
FIGS. 7A-7E are respective K-space representations of each windowed image space scatterer point of FIG. 6.
Figure 9:
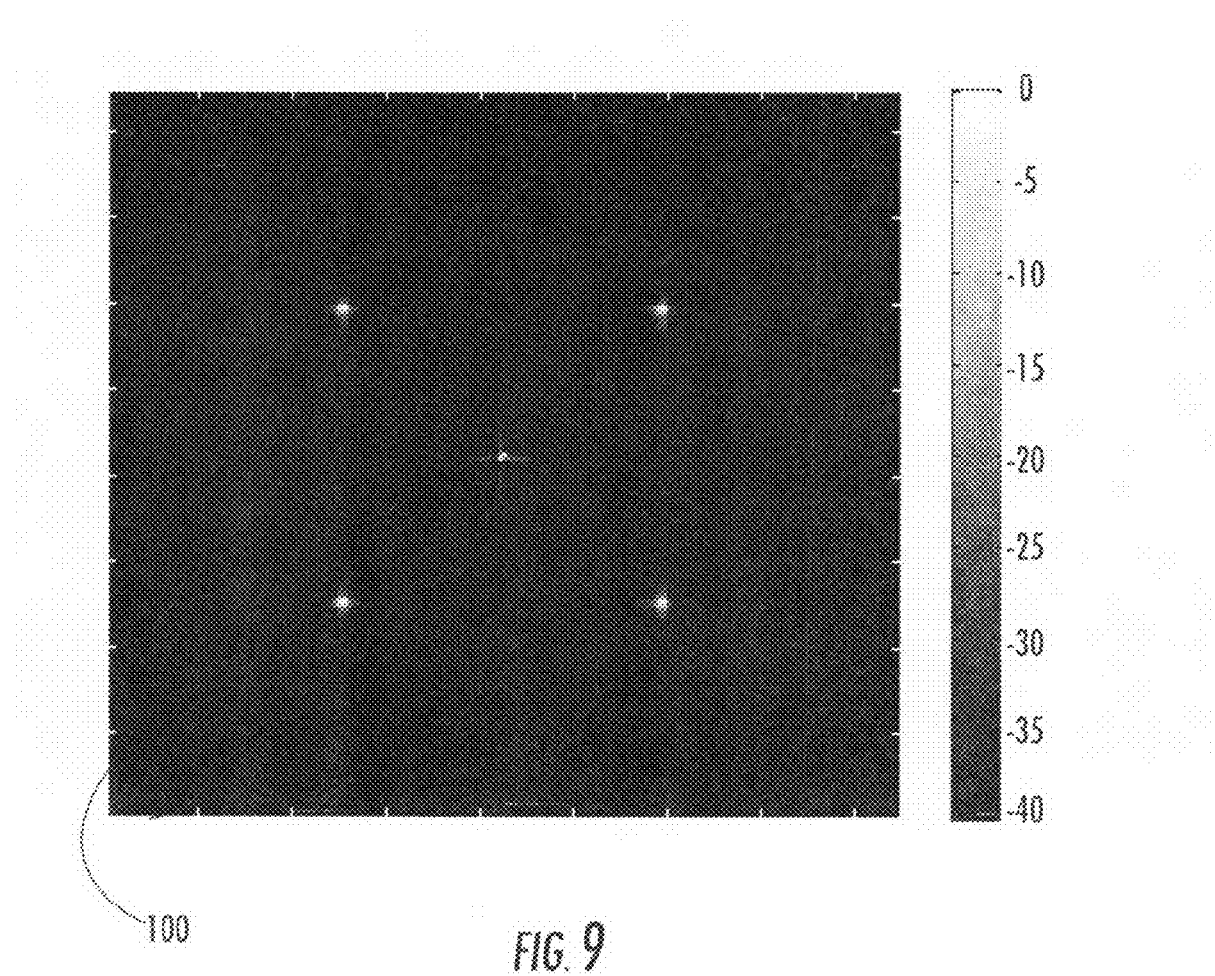
FIG. 9 is a reconstructed image space representation generated from the inpainted K-space data sets of FIGS. 8A-8E.

One of the windows 50 is shown in greater detail in FIG. 5A. The windowed image space data set 50 results in a corresponding K-space data set 55 (FIG. 5B) when transformed to K-space which, while having a reduced resolution with respect to the overall K-space data set 37 (FIG. 3A), generally has smoother phase and/or amplitude values than the overall K-space data set. This is because less frequency voids are included in the K-space data set, so there is less "smearing" caused by the voided data being spread throughout the K-space data set, as will be appreciated by those skilled in the art. Stated alternatively, there are less discontinuities in the phase/amplitude values of the geospatial K-space data set 55 than in the overall K-space data set 37. With partial differential equation (PDE) based inpainting models, for example, it may be difficult to obtain derivatives for data sets with large numbers of phase/amplitude discontinuities, as will also be appreciated by those skilled in the art.

Figure 4:
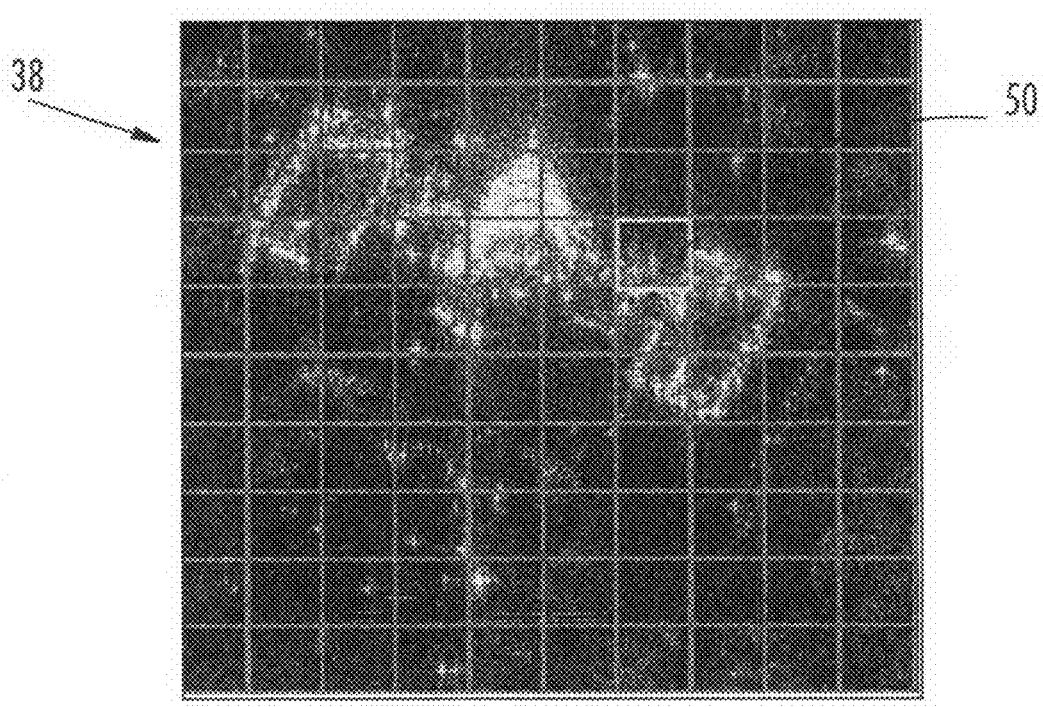
FIG. 4 is the image space representation of FIG. 3B with a window grid overlay illustrating a windowing scheme in accordance with an aspect of the invention.

The windowing scheme used in FIG. 4 is a relatively straightforward grid, in which the geospatial image data set 38 is divided into a plurality of equally sized squares as shown. Different window sizes and geometries are also possible in some embodiments. This approach may be considered mathematically as follows:

f(x,y) represents the image, and the image domain is partitioned into mn squares, indexed by ij, $1 \leq i \leq m, 1 \leq j \leq n$; let $\chi_{ij}(x,y)$ be the characteristic/windowing function of each sub square, and $f(x,y) = \Sigma f(x,y)\chi_{ij}(x,y)$.

Moreover, other windowing techniques may also be used. One such technique is illustrated in FIGS. 6-9, wherein rather than dividing an entire spatial domain data set into windows, windows are instead placed around the most problematic portions of the spatial domain data set, such as the five scatterer points included in the "top left," "top right," "middle," "bottom left," and "bottom right" windows in FIG. 6. The corresponding frequency domain (i.e., K-space) data sets 80a-80e corresponding to these five spatial domain scatterer point windows are shown in FIGS. 7A-7E, respectively. Each includes a respective void 81a-81e.

Once the windowed geospatial model spatial domain data sets 50 are transformed to define corresponding geospatial model frequency domain data sets 55, at Block 162, then the inpainting module 40 may advantageously begin inpainting the void(s) therein, at Block 163, to define inpainted geospatial model frequency domain data sets 90a-90e, which for the above-noted scatterer windows are shown in FIGS. 8A-8F. Generally speaking, the voids 81a-81e are inpainted by iteratively propagating contour (i.e., phase/amplitude) data from outside a given void into the given void (Blocks 163' and 166'). More particularly, the processor 22 inpaints by propagating contour data from outside the given void along a direction of lines of constant elevation contour from outside the given void into the void. More particularly, the lines of constant elevation contour may be based upon isophote and gradient directions at given points along the void boundary, as discussed further in the above-noted '811 application.

Various inpainting models may be used that are based upon different fluid flow modeling equations, such as PDEs, Stochastic, etc. By way of example, one general inpainting equation that may be used by the inpainting module 40 for the inpainting operations is the following:

$$\frac{\partial I}{\partial t} + \nabla^\perp I \cdot \nabla(\Delta I) = div(g(|\nabla I|)\nabla I), \text{ where} \quad (1)$$

$\Delta I = \nabla^2 I$, i.e. the Laplachian

In equation (1), $$\frac{\partial I}{\partial t}$$

is a time component of the equation, $\nabla^{-1}I\cdot\nabla(\Delta I)$ is a convective component, and $\text{div}(g(|\nabla I|)\nabla I)$ is an anisotropic diffusion component, as will be appreciated by those skilled in the art.

Another inpainting approach is based upon Navier-Stokes' equations, one implementation of which is as follows:

$$v_t + v\cdot\nabla v = -\nabla p + v\Delta v, \quad \nabla^* v = 0$$

where $$\nabla^\perp \Psi = v = \left(-\frac{\partial \Psi}{\partial y}, \frac{\partial \Psi}{\partial x}\right), \Psi$$

is the Stream Function;

$$\nabla\times(v_t + v\cdot\nabla v) = \nabla\times(-\nabla p + v\Delta v),$$

where $\nabla\times v = \omega$, thus, $\omega_t + v\cdot\nabla\omega = v\nabla^2\omega$, $$\omega = \nabla^2\Psi$$

(i.e., the Laplacian); and the Stream Function is defined as:

$$\Psi = I(x,y) \to r,$$

where $r \in \mathfrak{R}$ and $x,y \in N$.

Other inpainting models may be based upon Bertozzi, Sapiro, and Bartalmic equations, for example, as will be appreciated by those skilled in the art. An exemplary functional PDE inpainting approach is as follows:

For each k, where k represents the different scales of the wavelength decomposition, $$\frac{\partial v_k}{\partial t} + v_k \cdot \nabla F_k(t, x, y, v_k, v_X) = 0,$$

where $$F_k(t,x,y,v_k,v_X) = \alpha_k \delta_{mk} \int_{N_r^k} \int_{(0,0)} v_X(t, \xi, \eta)\, d\xi\, d\eta + \beta_k v_k(x,y),$$

$$v_X(t, \xi, \eta) = v(t, x+\xi, y+\eta), \text{ and}$$

$$v_k(x,y) = u(x,y) + c_k(x,y)n_k(x,y);$$

for $(\xi,\eta) \in N_r^k(0,0)$, the $\delta_{mk}$ is the Kronecker delta.

$\alpha_{mk}, \beta_k$ are suitably chosen constants and the function $c_k(x, y)$ is a weight function that appropriately turns the noise term "on" or "off".

Also, $N_r^k(0,0)$ is a neighborhood of the origin.

The inpainted geospatial model frequency domain data sets 90a-90e may then be reconstructed by the reconstruction module 41 into an overall reconstructed geospatial model spatial domain data set, at Block 164, thus concluding the illustrated method (Block 165). Thereafter, it may be further transformed to an overall reconstructed geospatial model spatial domain data set 100 (FIG. 9), at Block 167, for display on the display 33 (Block 168'), as will be appreciated by those skilled in the art.

Figure 10:
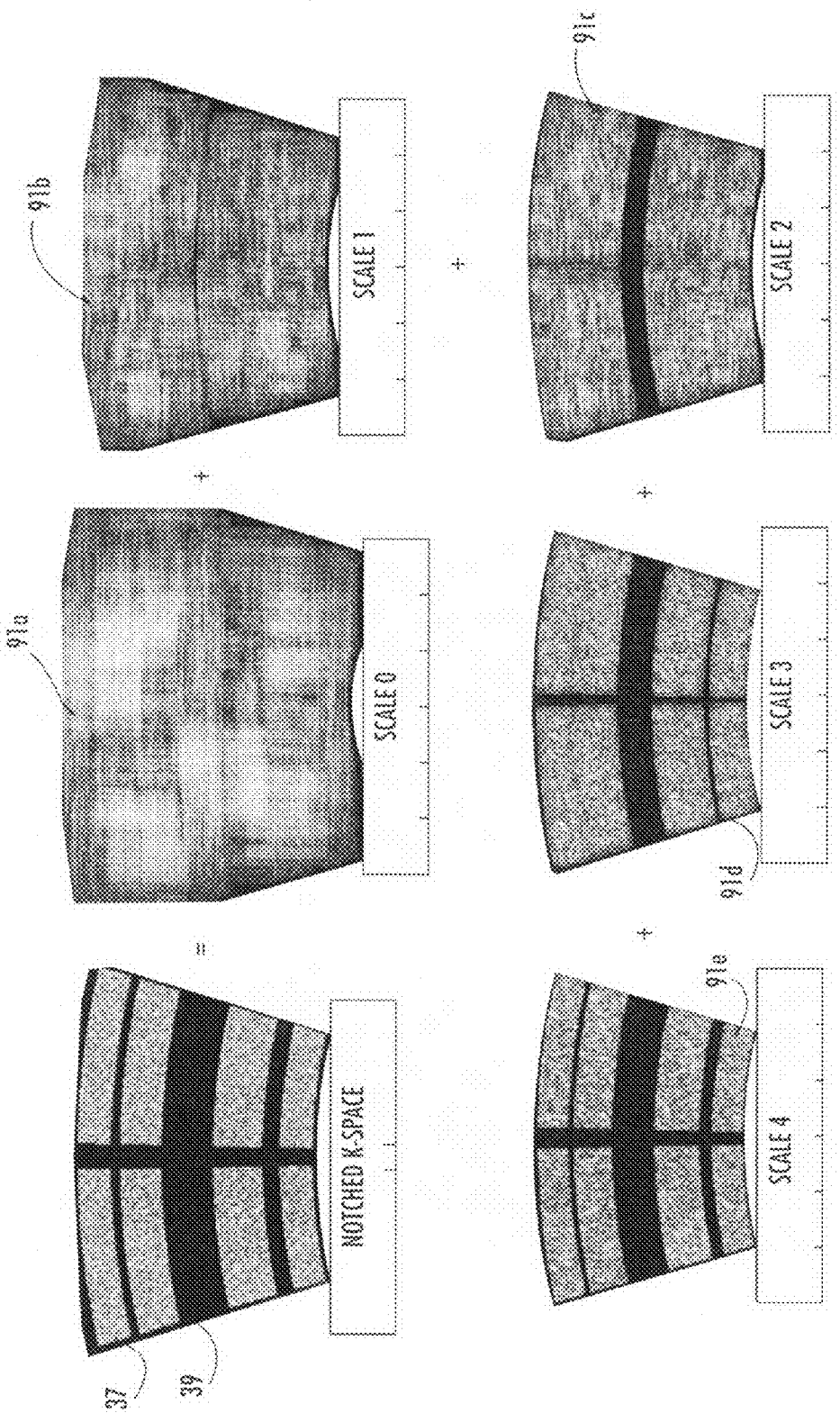
FIG. 10 is a series of scaled K-space wavelet representations of the K-space data set of FIG. 3A.
Figure 11:
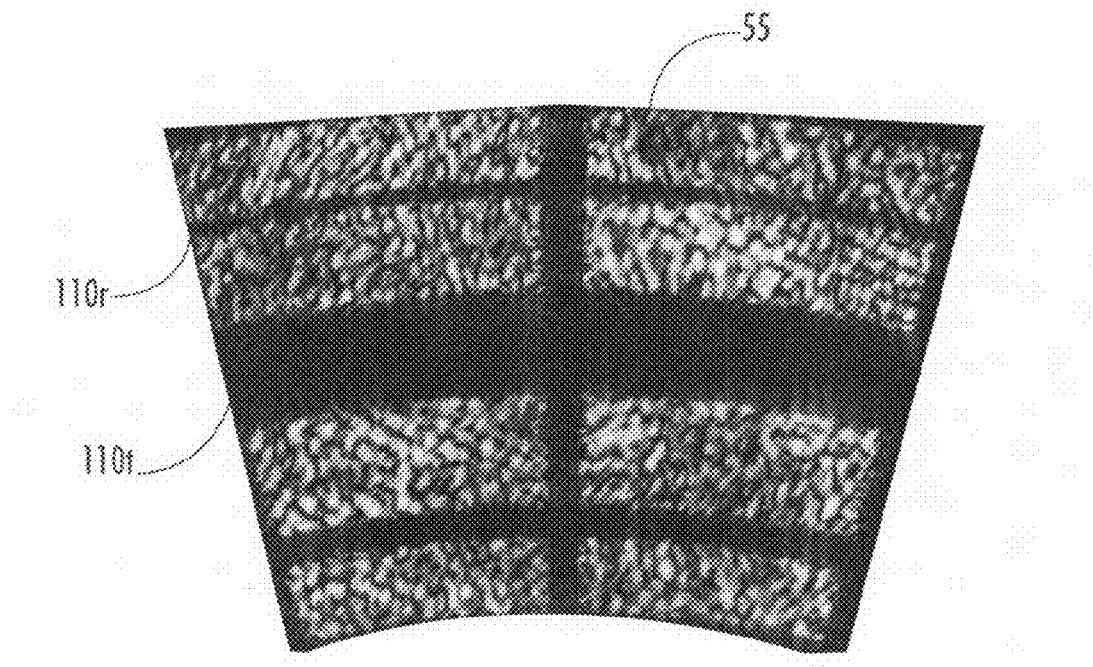
FIG. 11 is the K-space representation of FIG. 3A with a window grid overlay illustrating a windowing scheme for spectral interpolation in accordance with another aspect of the invention.
Figure 16:
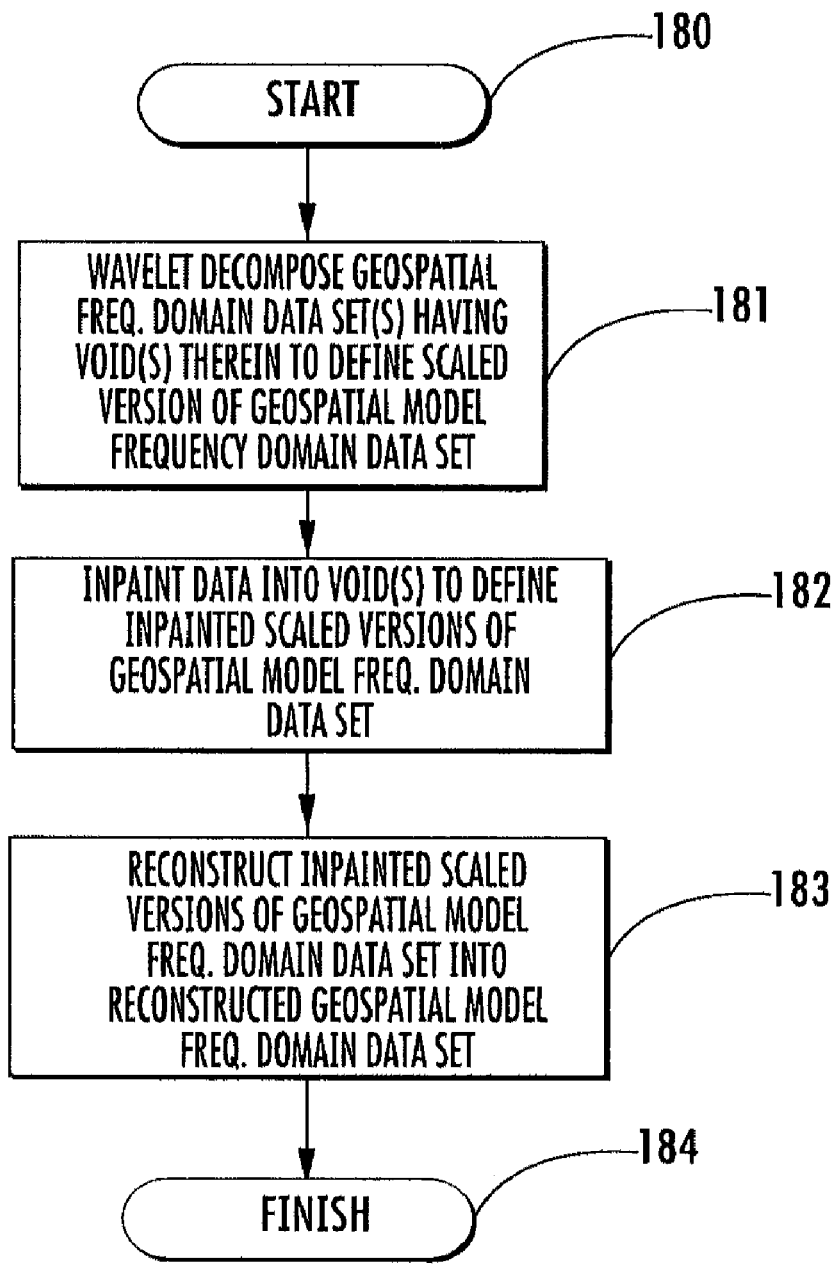
Figure 17:
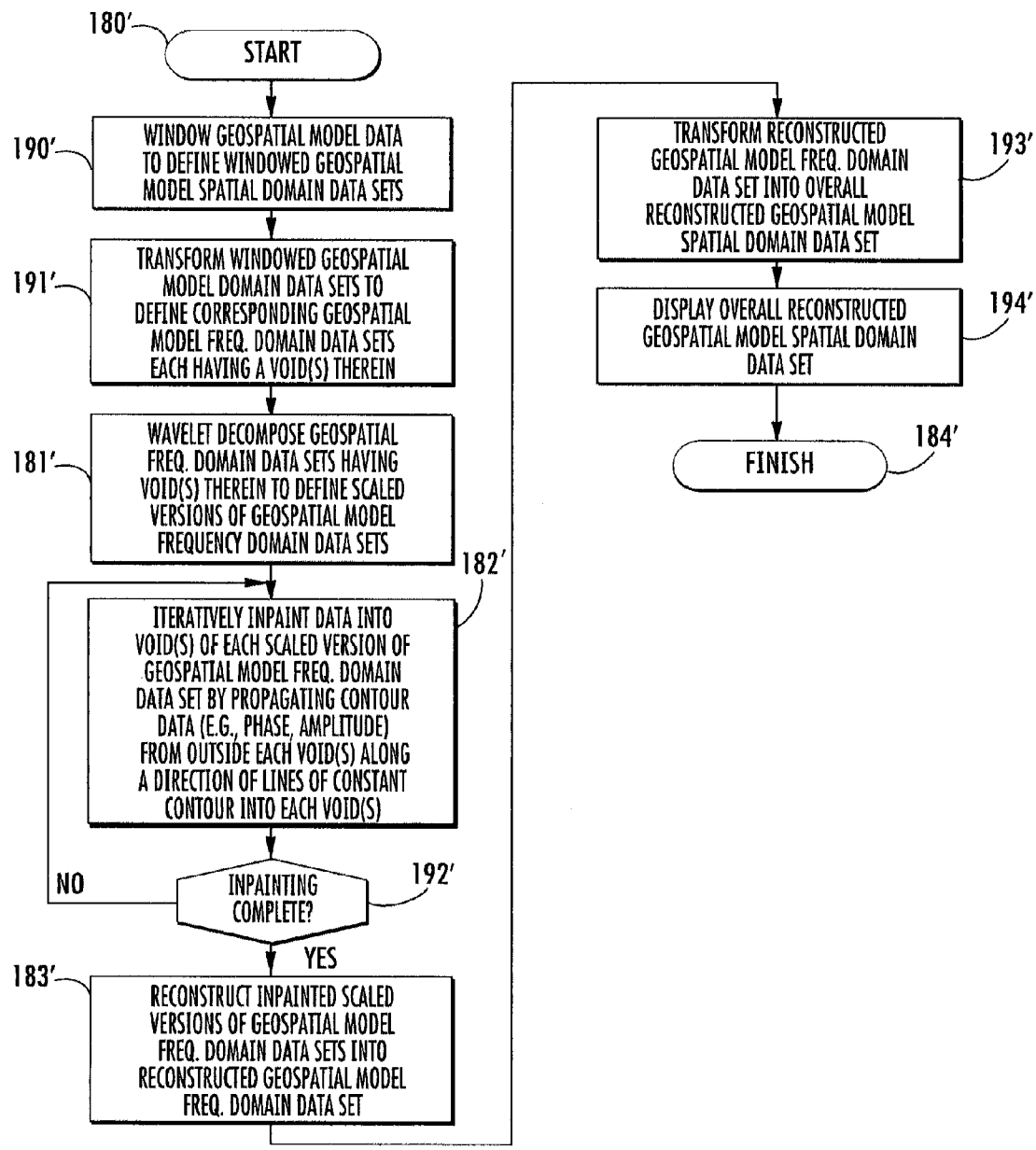
Figure 18:
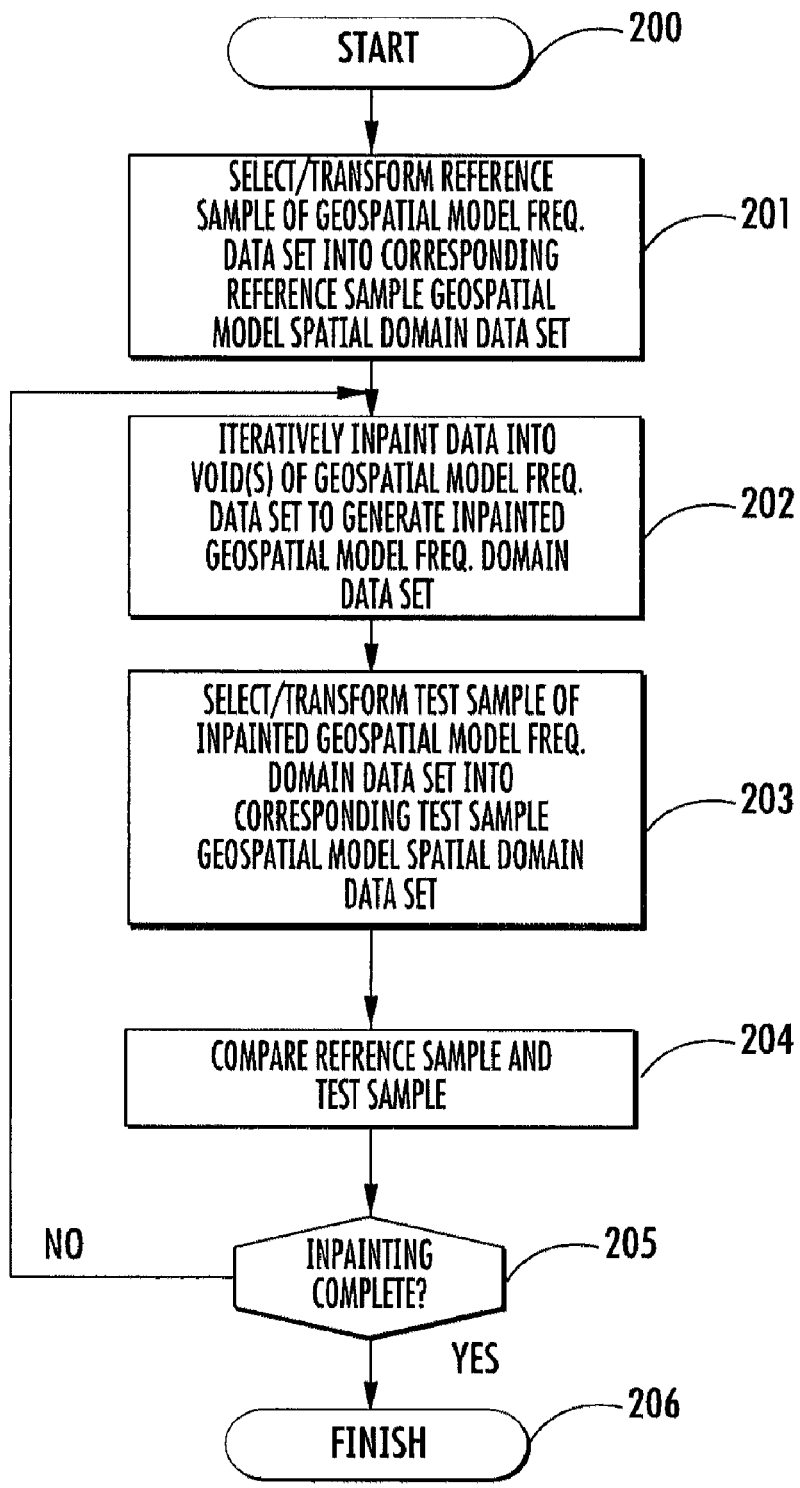
Figure 19:
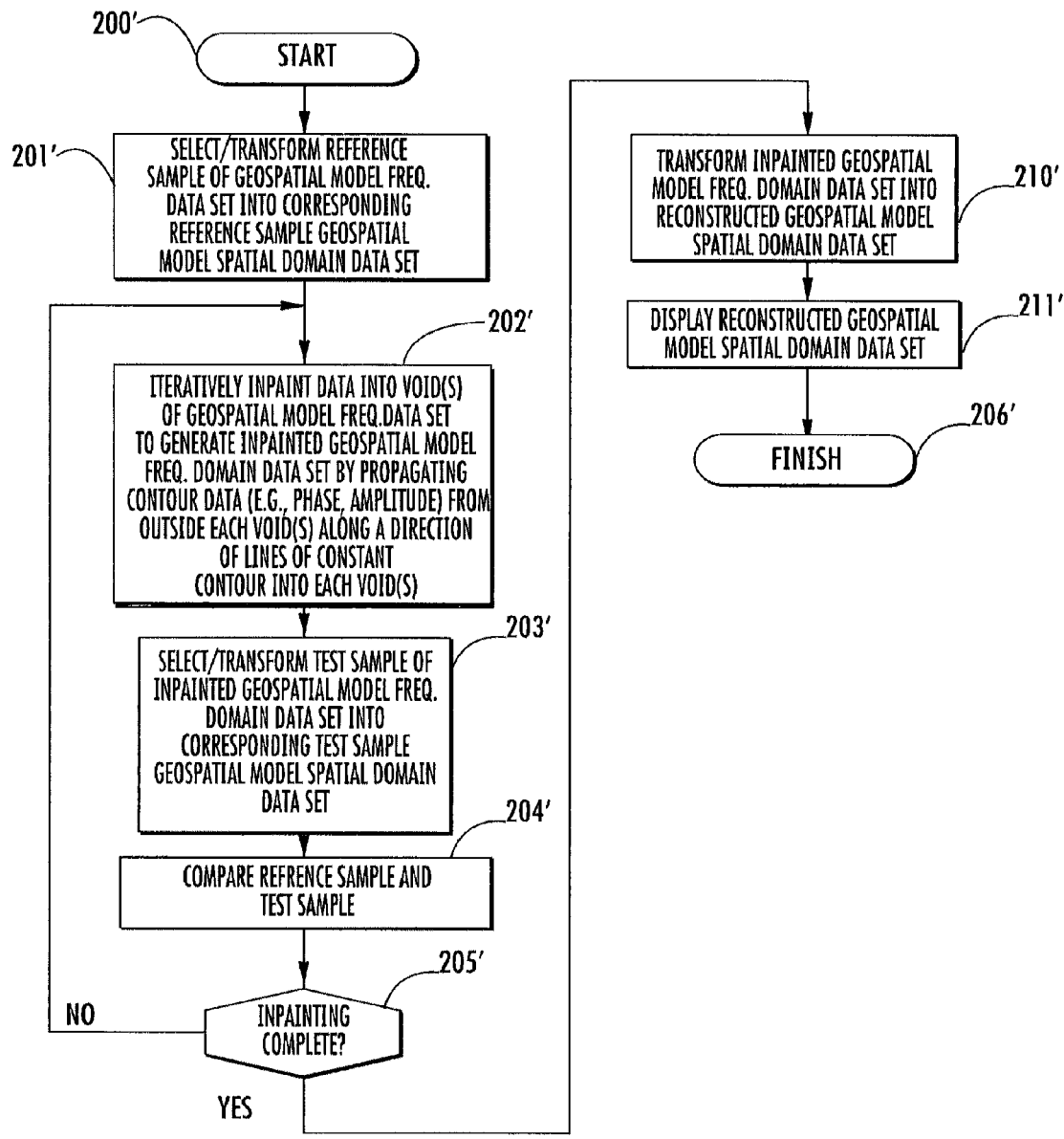

Turning now additionally to FIGS. 10 and 16-17, another technique which may be used by the processor 32 to provide still greater accuracy when reconstructing holes in frequency/K-space data through inpainting is to first perform wavelet decomposition on the given frequency/K-space data set(s) prior to inpainting. More particularly, beginning at Block 180, the geospatial model frequency domain data set 50 is decomposed by the windowing/transforming module 34 to define scaled versions 91a-91e thereof, as seen in FIG. 10 (Block 181). As will be appreciated by those skilled in the art, wavelet decomposition generates an expansion series with different order terms that represent different levels or resolutions (i.e., scales) of the overall geospatial model frequency domain data set 50. As such, the inpainting module 40 may then inpaint data into the voids 39 of each of the scaled data sets 91a-91e, at Block 182, and the inpainted scaled versions may then be reconstructed (i.e., amalgamated) into a reconstructed geospatial model frequency domain data set (Block 183) by the reconstruction module, thus concluding the method illustrated in FIG. 18 (Block 184).

By first performing wavelet decomposition and then performing inpainting on each of the scaled versions 91a-91e of the K-space data set 37, this may advantageously provide more accurate inpainting results than simply inpainting the unscaled K-space data set in its entirety. An exemplary wavelet decomposition equation that may be used is as follows:

$$f(X) = \Sigma c_{jk}\psi_{jk}(X) \qquad (2)$$

where $\psi_{jk}(X)$ are two dimensional wavelets

More particularly, the wavelet decomposition operations may be considered as follows:

for each i, j is $$F(f(x,y)\chi_{ij}(x,y)) = \Sigma c_{mn}\phi_{mn}(x,y) + d_{mn}\psi_{mn}^1(x,y) + e_{mn}\psi_{mn}^2(x,y) + f_{mn}\psi_{mn}^3(x,y),$$

where $\phi_{mn}(x,y), \psi_{mn}^1(x,y), \psi_{mn}^2(x,y), \psi_{mn}^3(x,y)$ are two dimensional wavelets. K space data is inpainted using the EPDE model with a "noise like" term, which is generally applicable to low scales, and K space data inpainted by a PDE model with a "noise like" term is generally applicable to high scales. The amalgam of the inpainted versions is taken to form the repaired image.

While the above-noted wavelet decomposition approach need not be used in conjunction with the windowing operations described above in all embodiments, in some embodiments it may be desirable to perform the spatial windowing followed by transformation of the windowed data sets to corresponding frequency domain data sets prior to wavelet decomposition (Blocks 190'-191'). Here again, the inpainting operations may be performed iteratively (Blocks 182', 192'), and the reconstructed geospatial model frequency domain data set may be transformed into an overall reconstructed geospatial model spatial domain data set for display on the display 33 (Blocks 193', 194'), as similarly discussed above.

In accordance with another advantageous aspect now described with reference to FIGS. 11, 12, 18, and 19, an approach for determining when desired accuracy has been obtained so that the iterative inpainting operations can be stopped is now described. Beginning at Block 200, a reference sample 110r of the geospatial model frequency data set 55 is selected and transformed into a corresponding reference sample geospatial model spatial domain data set, at Block 201. In one embodiment, the reference sample 110r may be selected using a relatively straightforward windowing approach similar to that described above, but instead of using a grid to window spatial domain data, the grid here is instead applied to the frequency domain data set 55 to define a plurality of frequency domain windows or data sets 110. Again, different grid shapes and sizes may be used in different embodiments. Preferably, the reference sample data set 110r will be one which includes little or no voids, as this will provide a more accurate corresponding spatial data set to use as a reference in subsequent operations.

The inpainting module 40 iteratively inpaints data into one or more voids in the geospatial frequency domain data set 55, as discussed further above, at Block 202. Furthermore, a test sample 110t of the inpainted geospatial model frequency domain data set 55 is selected and transformed into a corresponding test sample geospatial model spatial domain data set, at Block 203. More particularly, the test sample 110t is preferably from a voided area where data has been inpainted. As such, the processor 32 can advantageously compare the spatial domain reference sample 110r and test sample 110t to determine whether to stop the iterative inpainting within the test sample area, at Blocks 204-205, thus concluding the illustrated method (Block 206).

In particular, the comparison may involve comparison of a resolution level of the test sample 110t to determine if it has achieved a certain threshold level of the reference sample 110r resolution. For example, if the accuracy of the test sample 110t achieves a resolution level of 80% of that of the reference sample 110r, then inpainting is deemed completed for that test sample area. Otherwise, iterative inpainting will continue. It should be noted that different threshold levels may be used in different embodiments.

The comparison between the test sample 110t (with voids) and the reference sample 110r (without voids) is made possible by the holographic properties of the K-space data. That is, any given subset of the K-space data set 55 will produce the same image in image space as the entire K-space data set, just at a reduced resolution level (i.e., with more distortion). Therefore, by comparing two comparably sized samples of the K-space data, one of which has substantially no voids (i.e., the reference sample 110r) and that other which has a void(s) that is being inpainted (i.e., the reference sample 110t), it can be determined when the accuracy of the inpainted sample area adequately compares with that of the reference sample area for stopping purposes.

Figure 12:
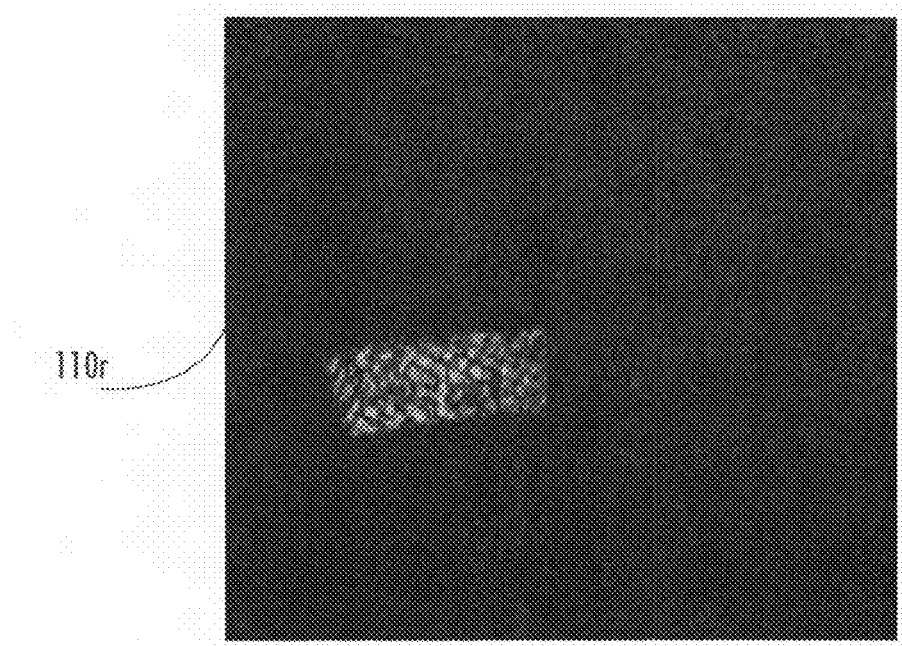
FIG. 12 is a K-space representation of a portion of FIG. 3A illustrating an alternative windowing scheme for spectral interpolation in accordance with another aspect of the invention.

As discussed further above, the completed reconstructed geospatial model frequency domain data set may be transformed into a reconstructed geospatial model spatial domain data set for display, at Blocks 210'-211'. It should also be noted that different approaches for selecting samples may be used instead of the grid method described above with reference to FIG. 11. By way of example, a reference sample 110r' may be selected that is in between spaced apart voids (i.e., an area without voids), as seen in FIG. 12. Other suitable approaches for selecting reference samples may also be used, as will be appreciated by those skilled in the art. It should be noted that the foregoing stopping technique may be used with or without the windowing and wavelet decomposition techniques described above.

Figure 13:
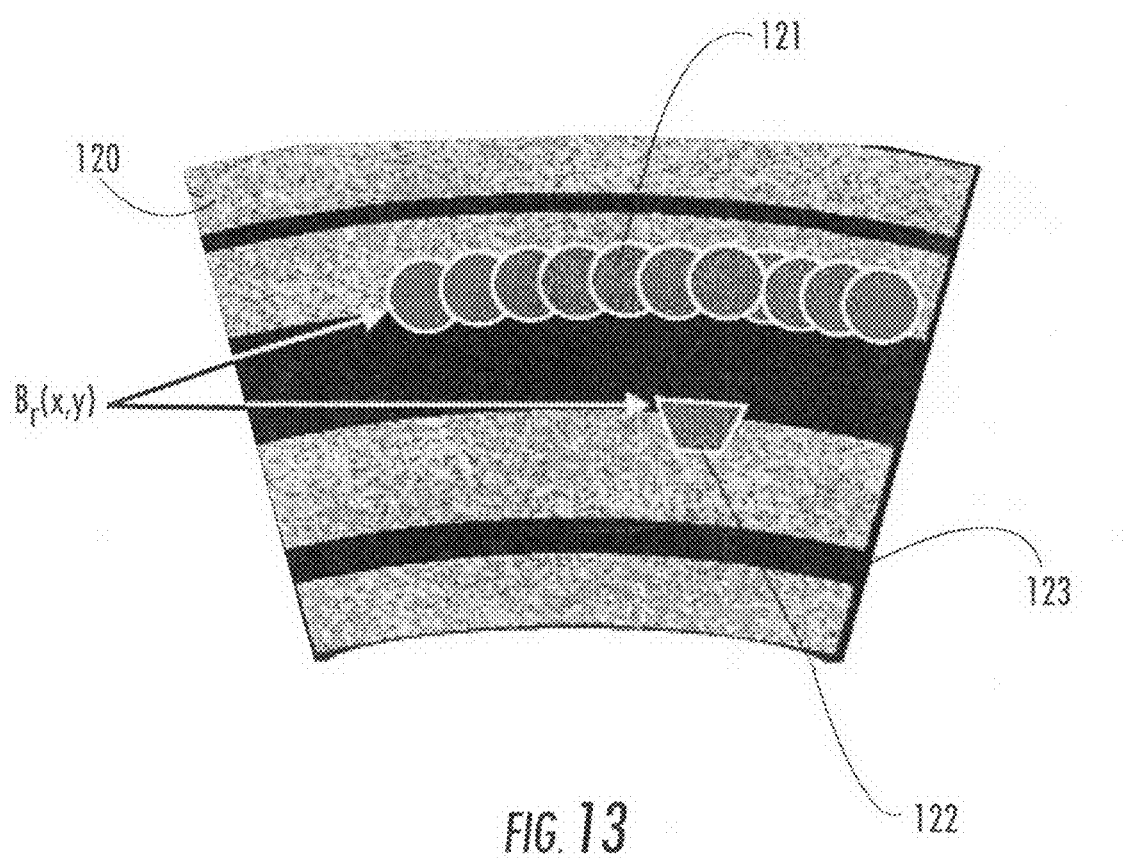
FIG. 13 is a K-space representation of a corrupted SAR data set illustrating the use of different inpainting boundary geometries.
Figure 14:
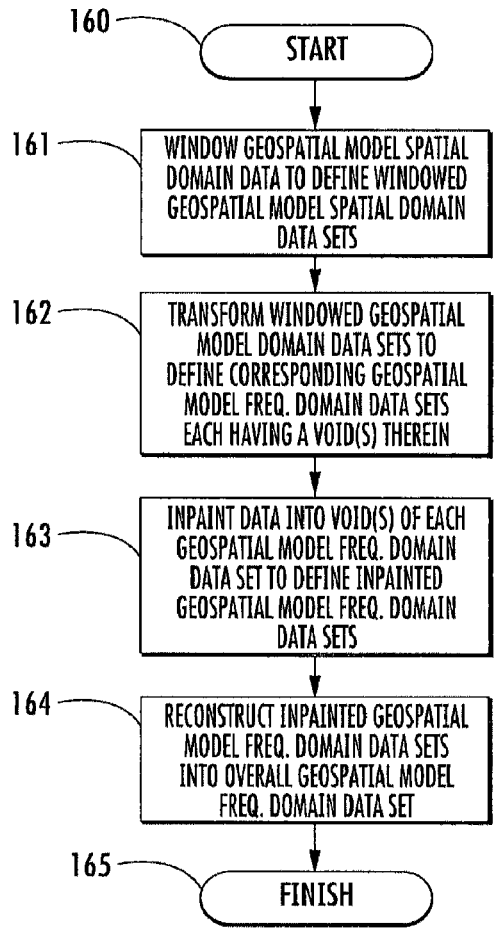
FIGS. 14-21 are flow diagrams illustrating various model data windowing, inpainting, and/or reconstruction method aspects in accordance with the invention.
Figure 15:
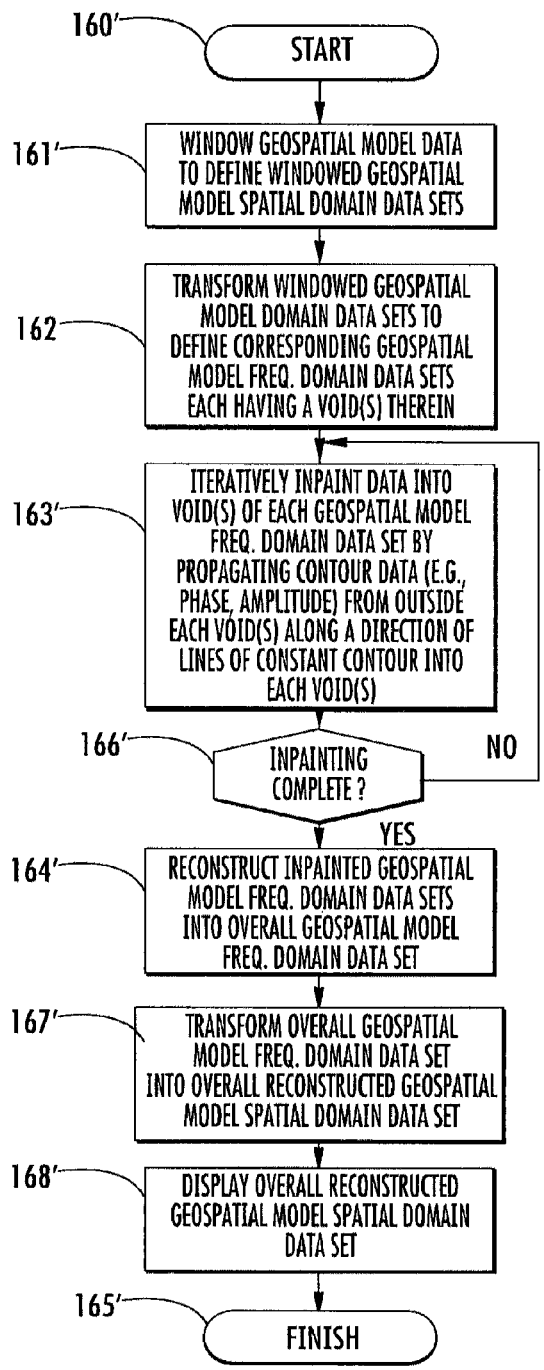
Figure 20:
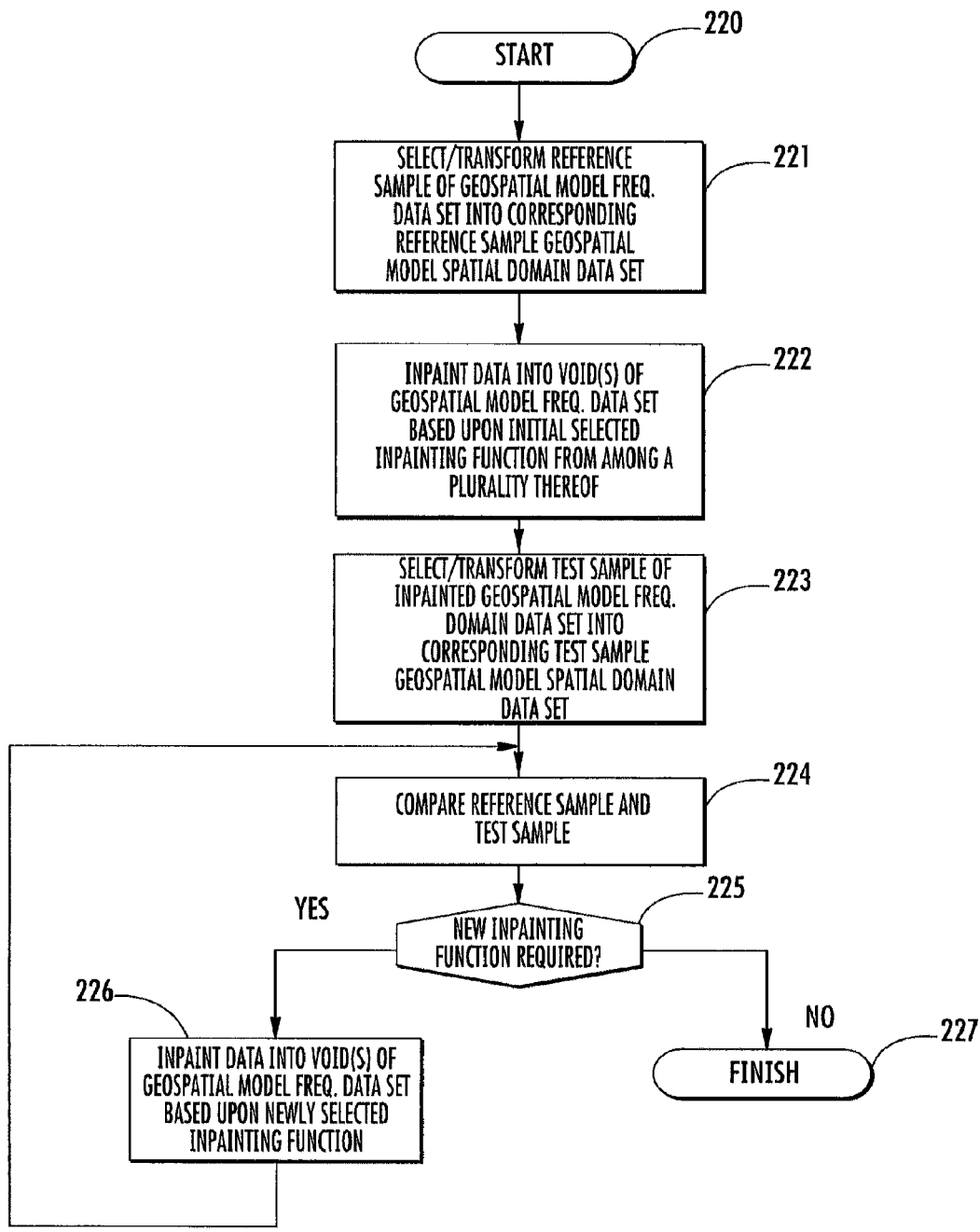
Figure 21:
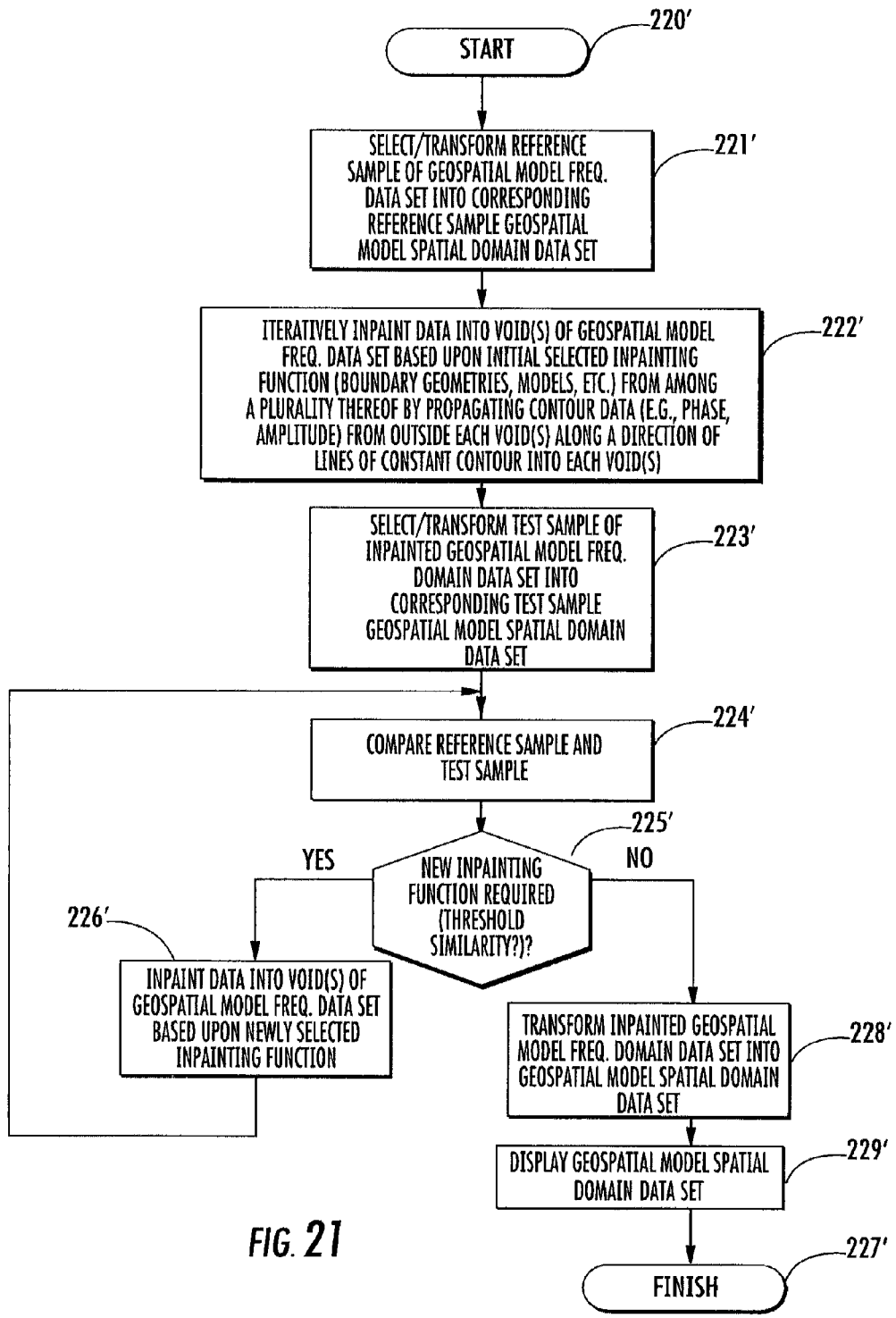

Referring now additionally to FIGS. 13 and 20-21, another advantageous aspect for selectively changing inpainting functions used for the inpainting operations is now described. As seen in FIG. 13, one example of different inpainting functions that may be used are different inpainting geometries, such as the illustrated circular and trapezoidal boundary areas 121 and 122 of a K-space geospatial data set 120. More particularly, the inpainting module 40 may perform inpainting within each of the individual boundary areas 121 and 122 until inpainting is complete. However, using different boundary shapes may advantageously provide more accurate inpainting in different embodiments depending upon the particular shapes and/or sizes of the voids 123 to be inpainted, as will be appreciated by those skilled in the art. Different inpainting geometries may be used at different locations in a same data set, as shown in some embodiments, or the same geometry may be selectively used throughout in a given embodiment.

Another inpainting function that can be selectively changed is the inpainting model equation or algorithm being used. As noted above, different modeling equations such as functional PDEs, stochastic models, Navier-Stokes', etc., may be used for different data sets, and/or for different locations within a same data set. The choice of which geometry, inpainting equation, etc., to use will generally depend upon factors such as the smoothness of the data to be inpainted, the size of the voids to be inpainted, the desired accuracy level, processing constraints, etc., as will be appreciated by those skilled in the art.

An exemplary approach for determining which inpainting function(s) to use for inpainting a given set of frequency domain model data 120 begins at Block 220 with selecting and transforming a reference sample of the model data into a corresponding reference sample spatial domain data set, at Block 221. Data is inpainted into one or more voids 123 of the data set 120 based upon one or more initial selected inpainting functions from among a plurality thereof, as described above, at Blocks 222, 222'. More particularly, there may be a plurality of different inpainting function types (e.g., inpainting boundary geometry, inpainting equation, etc.), and for each type there may be a plurality of different functions, as noted above. Thus, the processor 32 may select not only from among different function types, but for each function type may also advantageously select from a plurality of different functions within the function type.

A test sample of the inpainted model frequency domain data is selected and transformed into a corresponding test sample spatial domain data set, at Block 223. Similar to the above-described stopping approach, the reference sample is then compared with the test sample to determine whether a new inpainting function (and/or function type) is required, e.g., based upon a threshold difference between the two, as described above (Blocks 225, 225'). If the initial function does not provide the desired accuracy/results, then a new inpainting function is selected accordingly, at Block 226', and the test sample is inpainted once again based thereon. Once the desired accuracy is obtained, the inpainted model frequency domain data set is transformed into a corresponding spatial domain data set (Block 228') for display on the display 33, at Block 229, thus concluding the illustrated method (Block 227, 227').

Additional features of the invention may be found in co-pending applications entitled GEOSPATIAL MODELING SYSTEM PROVIDING WAVELET DECOMPOSITION AND INPAINTING FEATURES AND RELATED METHODS, application Ser. No. 11/858,255; GEOSPATIAL MODELING SYSTEM PROVIDING INPAINTING WITH STOPPING METRIC AND RELATED METHODS, application Ser. No. 11/858,270; and GEOSPATIAL MODELING SYSTEM PROVIDING VOID INPAINTING BASED UPON SELECTABLE INPAINTING FUNCTIONS AND RELATED METHODS, application Ser. No. 11/858,349, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
a geospatial model data storage device configured to store geospatial model spatial domain data; and
a processor coupled to said geospatial model data storage device and configured to:
subdivide the geospatial model spatial domain data into a plurality of subdivided geospatial model spatial domain data sets;
transform each of the plurality of subdivided geospatial model spatial domain data sets into a plurality of corresponding subdivided geospatial model frequency domain data sets, each having at least one void therein;
inpaint data into the at least one void of each subdivided geospatial model frequency domain data set to define a plurality of inpainted subdivided geospatial model frequency domain data sets; and
reconstruct the plurality of inpainted subdivided geospatial model frequency domain data sets into an overall reconstructed geospatial model frequency domain data set; and
transform the overall reconstructed geospatial model frequency domain data set into an overall reconstructed geospatial model spatial domain data set.

2. The geospatial modeling system of claim 1 wherein the subdivided geospatial model frequency domain data sets comprise K-space data.

3. The geospatial modeling system of claim 1 wherein said processor inpaints by propagating contour data from outside each at least one void along a direction of lines of constant contour from outside each at least one void into each at least one void.

4. The geospatial modeling system of claim 3 wherein said processor iteratively propagates the contour data from outside each at least one void into each at least one void.

5. The geospatial modeling system of claim 4 wherein the contour data comprises at least one of phase and amplitude data.

6. The geospatial modeling system of claim 1 wherein said processor performs inpainting based upon a functional partial different equation model.

7. The geospatial modeling system of claim 1 wherein said processor performs inpainting based upon a stochastic model.

8. A geospatial modeling system comprising:
a geospatial model data storage device configured to store geospatial model spatial domain synthetic aperture radar (SAR) data; and
a processor cooperating with coupled to said geospatial model data storage device and configured to:
subdivide the geospatial model spatial domain SAR data into a plurality of subdivided geospatial model spatial domain SAR data sets;
transform each of the plurality of subdivided geospatial model spatial domain SAR data sets into a plurality of corresponding subdivided geospatial model frequency domain SAR data sets, each having at least one void therein;
inpaint data into the at least one void of each subdivided geospatial model frequency domain SAR data set to define a plurality of inpainted subdivided geospatial model frequency domain SAR data sets;
reconstruct the plurality of subdivided inpainted geospatial model frequency domain data sets into an overall reconstructed geospatial model frequency domain SAR data set; and
transform the overall reconstructed geospatial model frequency domain SAR data set into an overall reconstructed geospatial model spatial domain SAR data set.

9. The geospatial modeling system of claim 8 wherein the geospatial model frequency domain SAR data sets comprise K-space data.

10. The geospatial modeling system of claim 8 wherein said processor inpaints by propagating contour data from outside each at least one void along a direction of lines of constant contour from outside each at least one void into each at least one void.

11. A modeling system comprising:
a model data storage device configured to store model spatial domain data; and
a processor cooperating with coupled to said model data storage device and configured to:
subdivide the model spatial domain data into a plurality of subdivided model spatial domain data sets;
transform each of the plurality of subdivided model spatial domain data sets into a plurality of corresponding subdivided model frequency domain data sets, each having at least one void therein;
inpaint data into the at least one void of each subdivided model frequency domain data set to define a plurality of inpainted subdivided model frequency domain data sets; and
reconstruct the plurality of inpainted subdivided model frequency domain data sets into an overall reconstructed model frequency domain data set; and
transform the overall reconstructed model frequency domain data set into an overall reconstructed model spatial domain data set.

12. The modeling system of claim 11 wherein the subdivided model frequency domain data sets comprise K-space data.

13. The modeling system of claim 11 wherein said processor inpaints by propagating contour data from outside each at least one void along a direction of lines of constant contour from outside each at least one void into each at least one void.

14. A geospatial modeling method comprising:
subdividing geospatial model spatial domain data into a plurality of subdivided geospatial model spatial domain data sets;
transforming each of the plurality of subdivided geospatial model spatial domain data sets into a plurality of corresponding subdivided geospatial model frequency domain data sets, each having at least one void therein;
inpainting data into the at least one void of each geospatial subdivided model frequency domain data set to define a plurality of inpainted subdivided geospatial model frequency domain data sets; and
reconstructing the plurality of inpainted subdivided geospatial model frequency domain data sets into an overall reconstructed geospatial model frequency domain data set; and
transforming the overall reconstructed geospatial model frequency domain data set into an overall reconstructed geospatial model spatial domain data set.

15. The method of claim 14 wherein the geospatial model spatial domain data comprises synthetic aperture radar (SAR) data.

16. The method of claim 14 wherein the subdivided geospatial model frequency domain data sets comprise K-space data.

17. The method of claim 14 wherein inpainting comprises inpainting by propagating contour data from outside each at least one void along a direction of lines of constant contour from outside each at least one void into each at least one void.

18. A modeling method comprising:
  subdividing model spatial domain data into a plurality of subdivided model spatial domain data sets;
  transforming each of the plurality of subdivided model spatial domain data sets into a plurality of corresponding subdivided model frequency domain data sets, each having at least one void therein;
  inpainting data into the at least one void of each subdivided model frequency domain data set to define a plurality of inpainted subdivided model frequency domain data sets; and
  reconstructing the plurality of inpainted subdivided model frequency domain data sets into an overall reconstructed model frequency domain data set; and
  transforming the overall reconstructed model frequency domain data set into an overall reconstructed model spatial domain data set.

19. The method of claim 18 wherein the subdivided model frequency domain data sets comprise K-space data.

20. The method of claim 18 wherein inpainting comprises inpainting by propagating contour data from outside each at least one void along a direction of lines of constant contour from outside each at least one void into each at least one void.

* * * * *